(12) United States Patent
George et al.

(10) Patent No.: US 7,641,499 B1
(45) Date of Patent: Jan. 5, 2010

(54) HIGH VOLTAGE CONNECTOR AND INTERLOCKING LOOP CONNECTOR ASSEMBLY

(75) Inventors: Terry A. George, Salem, OH (US); Joseph Sudik, Jr., Niles, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/229,938

(22) Filed: Aug. 28, 2008

(51) Int. Cl.
*H01R 13/627* (2006.01)
(52) U.S. Cl. .................. 439/352; 439/595; 439/489
(58) Field of Classification Search ................ 439/595, 439/488–490
See application file for complete search history.

(56) References Cited

U.S. PATENT DOCUMENTS

| 5,236,373 | A | | 8/1993 | Kennedy |
| 5,692,923 | A | * | 12/1997 | Sawada ....................... 439/350 |
| 6,119,668 | A | | 9/2000 | Richards et al. |
| 6,491,542 | B1 | | 12/2002 | Zerebilov |
| 6,572,401 | B2 | * | 6/2003 | Kurimoto et al. ........... 439/489 |
| 7,081,193 | B2 | | 7/2006 | Dewey et al. |
| 7,084,361 | B1 | | 8/2006 | Bowes et al. |
| 7,381,084 | B1 | | 6/2008 | Horn et al. |
| 7,402,068 | B1 | * | 7/2008 | Tarchinski .................. 439/357 |
| 2005/0032404 | A1 | * | 2/2005 | Furuta et al. ................ 439/157 |
| 2008/0220652 | A1 | * | 9/2008 | Tyler .......................... 439/610 |

* cited by examiner

*Primary Examiner*—Briggitte R Hammond
(74) *Attorney, Agent, or Firm*—Thomas N. Twomey (57) ABSTRACT

A high voltage and interlock loop assembly has first and second high voltage connector housings complementarily constructed for releasable engagement with each other and for having a high voltage circuit running therethrough. First and second connectors for an interlock loop circuit are complementarily constructed for releasable engagement with each other with one of the interlock loop connectors being mounted on one of the high voltage connector housings. The first and second interlock loop connectors have complementarily abutment shoulders with one abutment shoulder being on a flexible tab. The flexible tab is movable to misalign its abutment shoulder from the other abutment shoulder when the high voltage connector housings are properly engaged together to allow full engagement of the first and second interlock loop connectors.

7 Claims, 8 Drawing Sheets

HIGH VOLTAGE CONNECTOR AND INTERLOCKING LOOP CONNECTOR ASSEMBLY

TECHNICAL FIELD

The field of this invention relates to a high voltage connector assembly and more particularly for a high voltage connector assembly that incorporates a high voltage interlock loop connector assembly for automotive applications.

BACKGROUND OF THE INVENTION

Vehicles that are propelled by internal combustion engines have low voltage circuits that are used to operate numerous devices for example, turn signals, headlights, brake lights, radios, and electronic instrument panels. Electric or hybrid vehicles on the other hand need to have a high voltage circuitry to provide the needed wattage to run the main electric motors and other devices that have typically been belt driven. It is foreseen that many more electric type vehicles will enter the commercial market that use high voltage (typically 300V or higher) to power these devices and will need high voltage connectors for the circuits.

In order to allow easy installation and disconnection of various electrical components for repair and replacement, the high voltage circuit for these electric and hybrid vehicles may have several conveniently placed high voltage connectors that may be connected together or disconnected from each other.

Furthermore, due to the high voltage and large amperage involved, it is a prerequisite to shut down the high voltage circuit in question before an automotive technician or other individual disconnects any high voltage connector. To prevent premature physical contact with the high voltage circuit, interlock loop circuitry, often referred to as high voltage interlock loops (HVIL), have been devised which when triggered will activate a shut-off program to shut down the high voltage circuit. One such trigger is an interlock loop connector in the HVIL circuit that often is piggybacked onto the high voltage connectors to allow the high voltage electrical circuit to shut down and adequately discharge after the HVIL circuit becomes disconnected but before the connector housing of the high voltage connector assembly can become disconnected.

Present HVIL connectors system are costly, bulky and contain extra parts which are subject to grease and grime buildup that may eventually interfere in its operation.

What is needed is a smaller and more reliable connector for an HVIL system. What is also needed is an HVIL connector that uses as part of its structure a connection position assurance device on the high voltage connector housing.

SUMMARY OF THE DISCLOSURE

In accordance with one aspect of the invention, a high voltage and interlock loop connector assembly has first and second high voltage connector housings as part of a high voltage circuit running therethrough. The first and second high voltage connector housings are complementarily constructed for releasable engagement with each other. First and second connectors for an interlock loop circuit are also complementarily constructed for releasable engagement with each other. The first and second interlock loop connectors preferably are movable to disconnect and break an interlock loop circuit running therethrough. One of the first or second interlock loop connectors is mounted on one of the high voltage connector housings. The first and second interlock loop connectors each have complementarily abutment shoulders with one abutment shoulder being on a flexible tab. The abutment shoulders abut each other and prevent full engagement of the connectors when the first and second high voltage connector housings are not fully engaged with each other. The flexible tab is movable by one of the high voltage connector housings to misalign its abutment shoulder from the other abutment shoulder when the high voltage connector housings are properly engaged together to allow full engagement of the first and second interlock loop connectors.

Preferably, the first and second high voltage connector housings have a latching handle mechanism constructed to be non-releasable when the first and second interlock connectors are engaged to each other. It is also preferred that the high voltage connector housings require engagement with a tool to complete disconnection of the high voltage circuit within the high voltage connector housings after disconnection of the interlock loop circuit within the interlock loop interlock loop connectors.

In one embodiment, one of the high voltage connector housings has a connector positioned assurance device. Preferably, the connector position assurance device has a slide member with a locking protrusion that extends into an opening in the first high voltage connector housing when in the engaged position. The locking protrusion is recessable out of the opening by a tool sized to enter the opening to allow the connector position assurance slide member to move to its disengaged position and to allow the latching handle mechanism to be releasable and to allow disconnection of the first and second high voltage connector housings. Furthermore, the locking protrusion may be positioned at a distal end of a resiliently flexible tongue section of the slide member. The tongue section is flexible to allow the locking protrusion to flex and descend out of the opening under a stop shoulder. It is desired that the opening and the locking protrusion are covered by the interlock loop connectors when the interlock connectors are engaged.

In one embodiment, the flexible tab is deflectable upward by a surface of the connector position assurance slide member when the high voltage connector housings are in the fully engaged position and the connector position assurance slide member is in the locked position. One of the interlock loop connectors and the high voltage connector housings have a groove to receive the flexible tab to let it resiliently bias back downward to a rest position when the interlock loop connectors are fully engaged.

BRIEF DESCRIPTION OF THE DRAWINGS

Reference now is made to the accompanying drawings in which.

DETAILED DESCRIPTION OF THE PREFERRED EMBODIMENT

Figure 1:
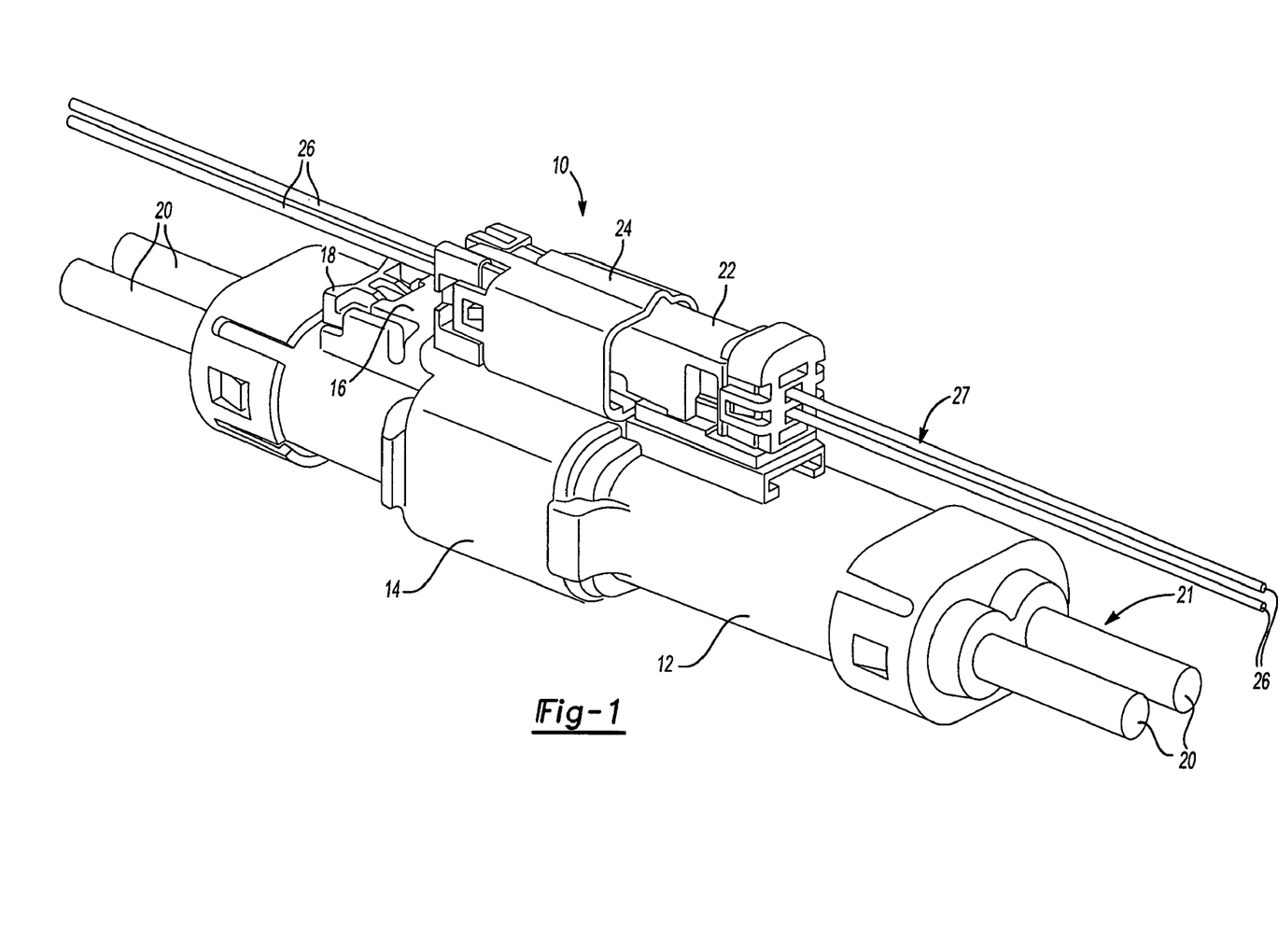
FIG. 1 is a perspective assembled view of a high voltage and HVIL connector assembly showing the first and second HVIL connectors assembled on top of the first and second high voltage connector housings.

Referring now to FIG. 1, a high voltage and HVIL connector assembly 10 is shown with a male high voltage housing 12 connected to a female high voltage housing 14. A latching device 16 and connection position assurance device 18 are housed on the female connector housing 14. High voltage wires 20 extend from each housing 12 and 14 and connect together when the two housings 12 and 14 are connected as part of a high voltage circuit 21.

A male HVIL connector 22 is piggy backed on top of the male housing 12. The connector 22 may be integrally formed with the male housing 12. A female HVIL connector 24 is removably mounted on top of the female housing 14. 14. Low voltage HVIL wires 26 are operably connected to the HVIL connectors 22 and 24 that contact each other to form part of an HVIL circuit 27. When the connectors 22 and 24 become disconnected the HVIL circuit 27 becomes open and is programmed to open the high voltage circuit 21 by disconnecting from a high voltage source (not shown). A period of time, for example 5 seconds, is required to insure an adequate discharge of the voltage to less than 60 volts after the high voltage circuit 21 is disconnected from the high voltage source.

In order to assure that the appropriate period of time occurs between the opening of the HVIL circuit 27 and the access to the high voltage circuit 21, the high voltage connector housings 12 and 14 and the HVIL connectors 22 and 24 are constructed to take time to disconnect. In particular, the period of time needs to be long enough from first disengagement of the HVIL circuit 27 and when the HVIL connector housings are disengaged to the time the high voltage connector housing 12 and 14 become accessible and are first pulled apart to open the high voltage circuit 21.

It is desired that the latching device 16 is inoperable and/or inaccessible when the HVIL connectors 22, 24 are engaged. Furthermore, once the HVIL low voltage circuit 27 is open by pulling apart the two connectors 22 and 24, the needed use of a tool provides time when a person picks up the tool and uses it to access a mechanism before the full disconnection of the two high voltage housings 12 and 14 is possible.

Figure 2:
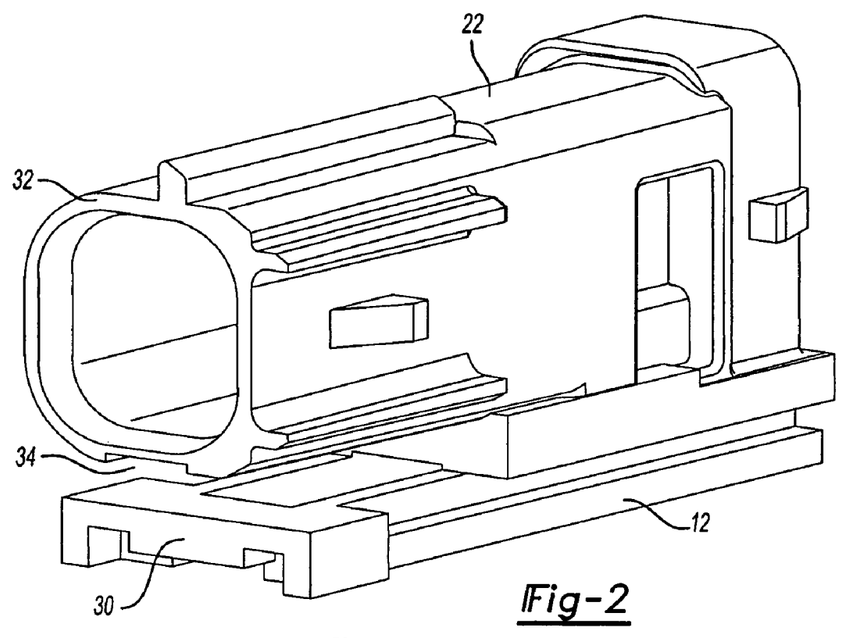
FIG. 2 is a perspective view of the second HVIL connector shown in FIG. 1.

A male low voltage connector 22 is housed or mounted on the male high voltage housing 12 as more clearly shown in FIG. 2. The low voltage connector 22 may be integrally formed with the high voltage housing 12. The low voltage connector 22 has a stop shoulder 30 formed near the male entry end 32 for the low voltage electric terminal connectors (not shown). A slot 34 is formed between the stop tab 30 and the end 32 that axially extends rearwardly.

Figure 3:
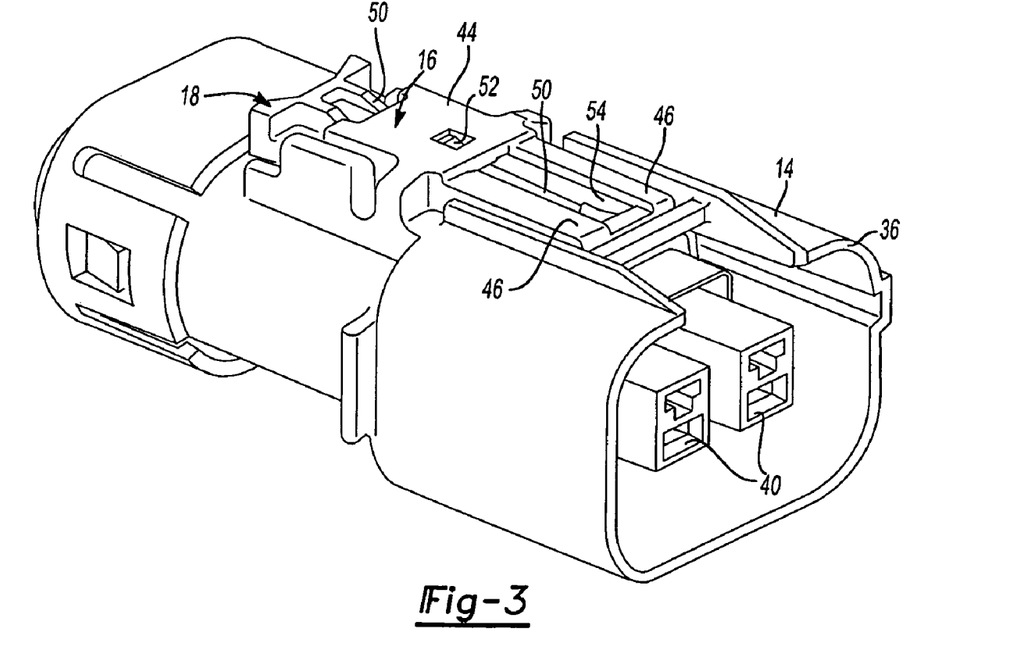
FIG. 3 is a perspective view of the first high voltage connector housing shown in FIG. 1.
Figure 3A:
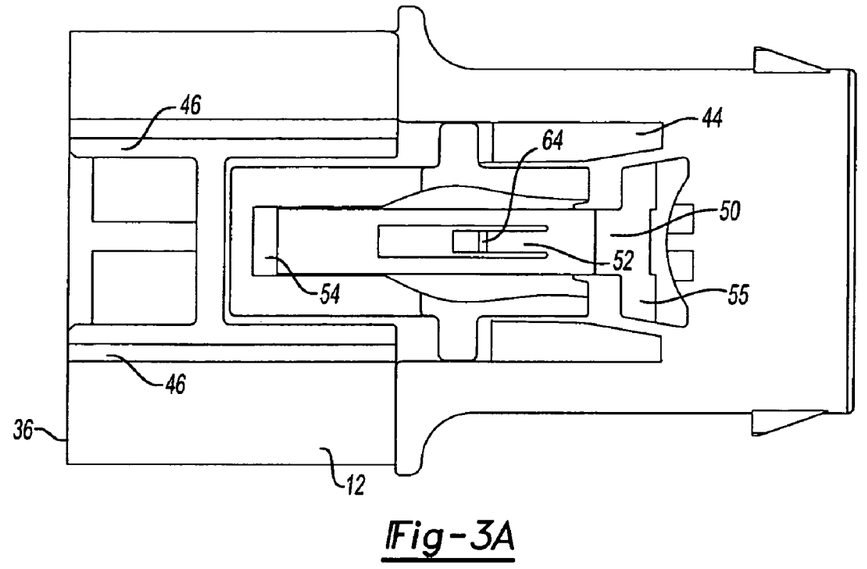
FIG. 3A is a top plan partially broken view of the first high voltage connector housing illustrating the connection position assurance slide member.
Figure 5:
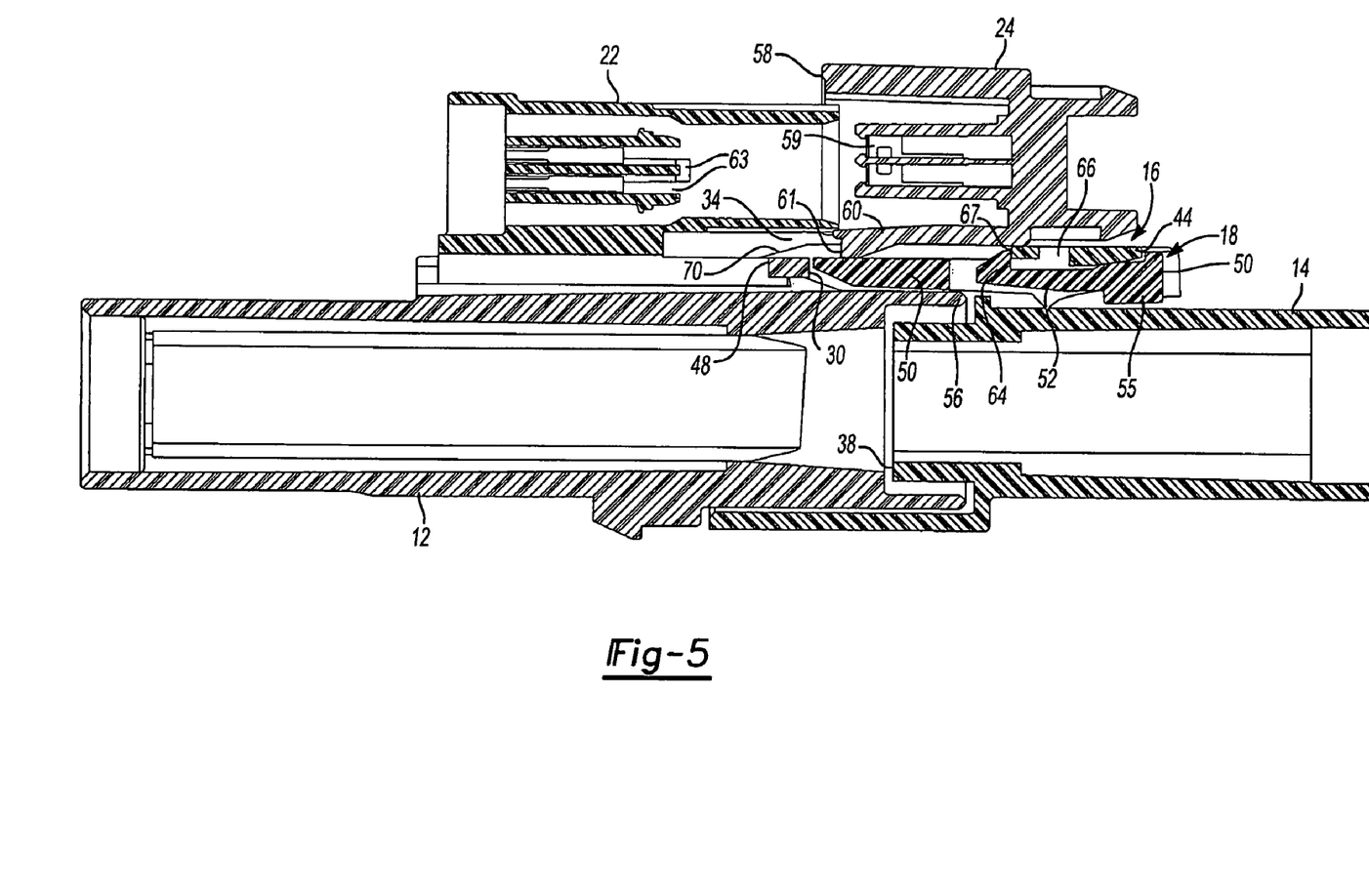
FIG. 5 is a cross-sectional view of the assembly shown in FIG. 1 with the high voltage connector housing fully engaged and the HVIL connectors in position to be engaged.

As shown in FIGS. 3 and 5, the female high voltage connector housing 14 has a first end 36 for receiving an end 38 of the male connector housing 12 and has high voltage terminals 40 that engage complementary high voltage terminals. (not shown) in male connector housing 12. At a top surface, the latch device 16 has a latch handle 44 that operates locking latches 46 that releasably engage complementary recesses 48 in the male housing 12 to latch and lock the two high voltage housings 12 and 14 together.

The connector position assurance device 18 includes a slide member 50 that slides along a groove 54 in the female connector 14 under the latch handle 44. The male connector 12 as more clearly shown in FIGS. 5 and 6 has an abutment section 56 which receives and deflects the slide 50 upwardly within the groove 54 when pushed to the assured position. When the movable slide member 50 is fully engaged, its thicker handle end 55 prevents the latch handle 44 from being operably depressed to pivot the latches 46 upward. Therefore, the latches 46 cannot lift and disengage from the male connector housing 12.

Figure 4:
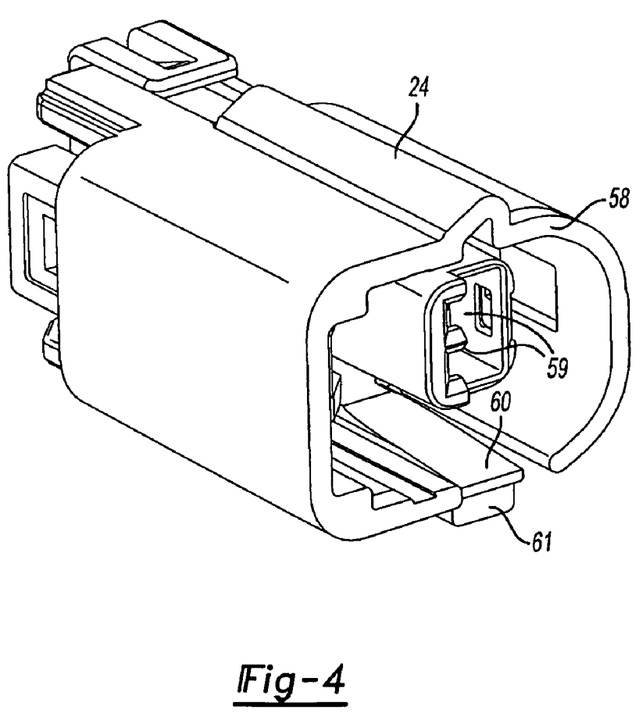
FIG. 4 is a perspective view of the first HVIL connector shown in FIG. 1.

As shown in FIG. 4, the connector 24 has a female end 58 with low voltage terminals 59 for the HVIL circuit 27. A flexible tab 60 is formed with one abutment shoulder 61 at end 58 that can be radially flexed inwardly (upwardly as shown in the Figures) but resiliently biased to its rest position as shown in FIG. 4.

Figure 6:
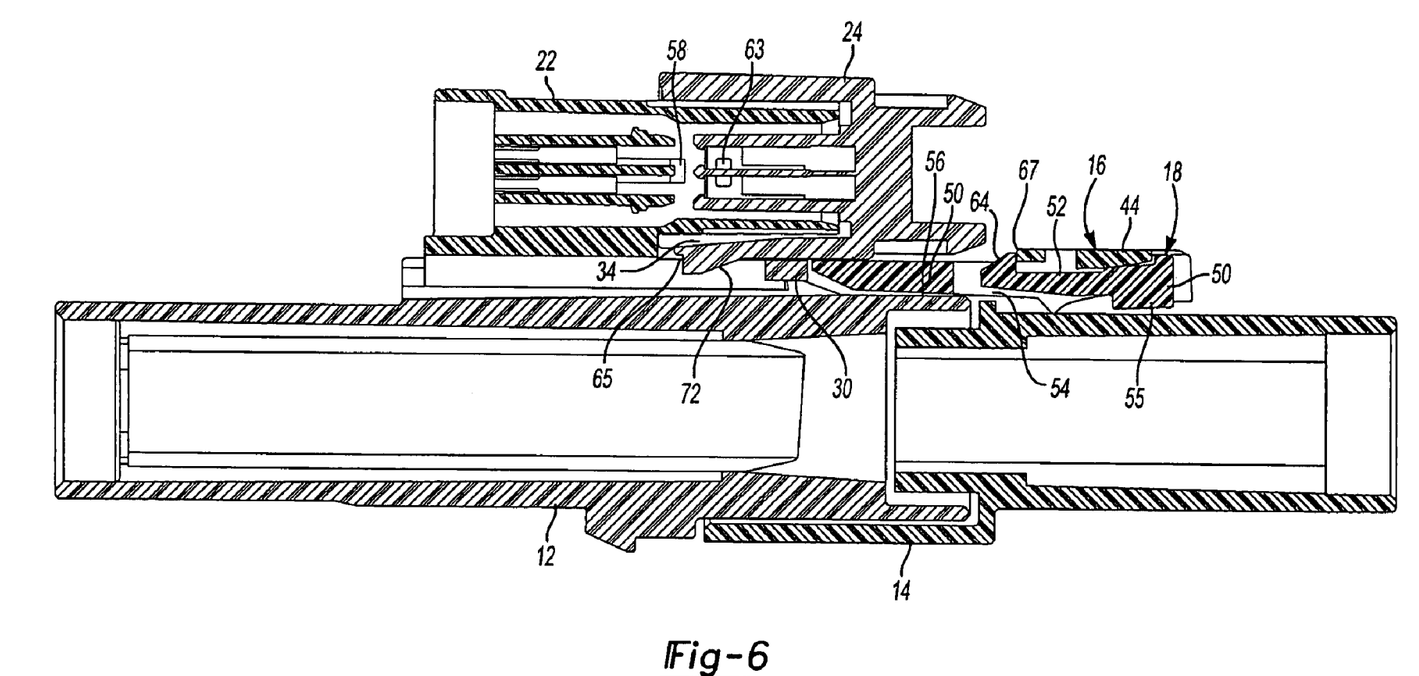
FIG. 6 is a cross-sectional view similar to FIG. 5 with the HVIL connectors fully engaged.

As shown in FIG. 5, when the two low voltage connectors 22 and 24 are engaged after the high voltage connector housings 12 and 14 are engaged, the flex tab 60 is flexed upwardly as it rides on top of the slide 50. Slide 50 misaligns its abutment shoulder 61 to pass over the stop shoulder 30 and enter slot 34 to the engaged position as shown in FIG. 6. In the engaged position as shown in FIG. 6, terminals 58 engage terminals 63 in housing 24. The latch handle 44 even though exposed is not operational because of the lock out function of the CPA device 18, particularly by the interposition of thicker section 55. Once the low voltage connectors 22 and 24 are fully engaged the flex tab 60 is allowed to resiliently flex back to a rest position as shown in FIG. 6 by engaging a recess 65 within the slot 34. This alleviates long term stress on the flex tab 60 during the installed position and increases it durability.

Figure 7:
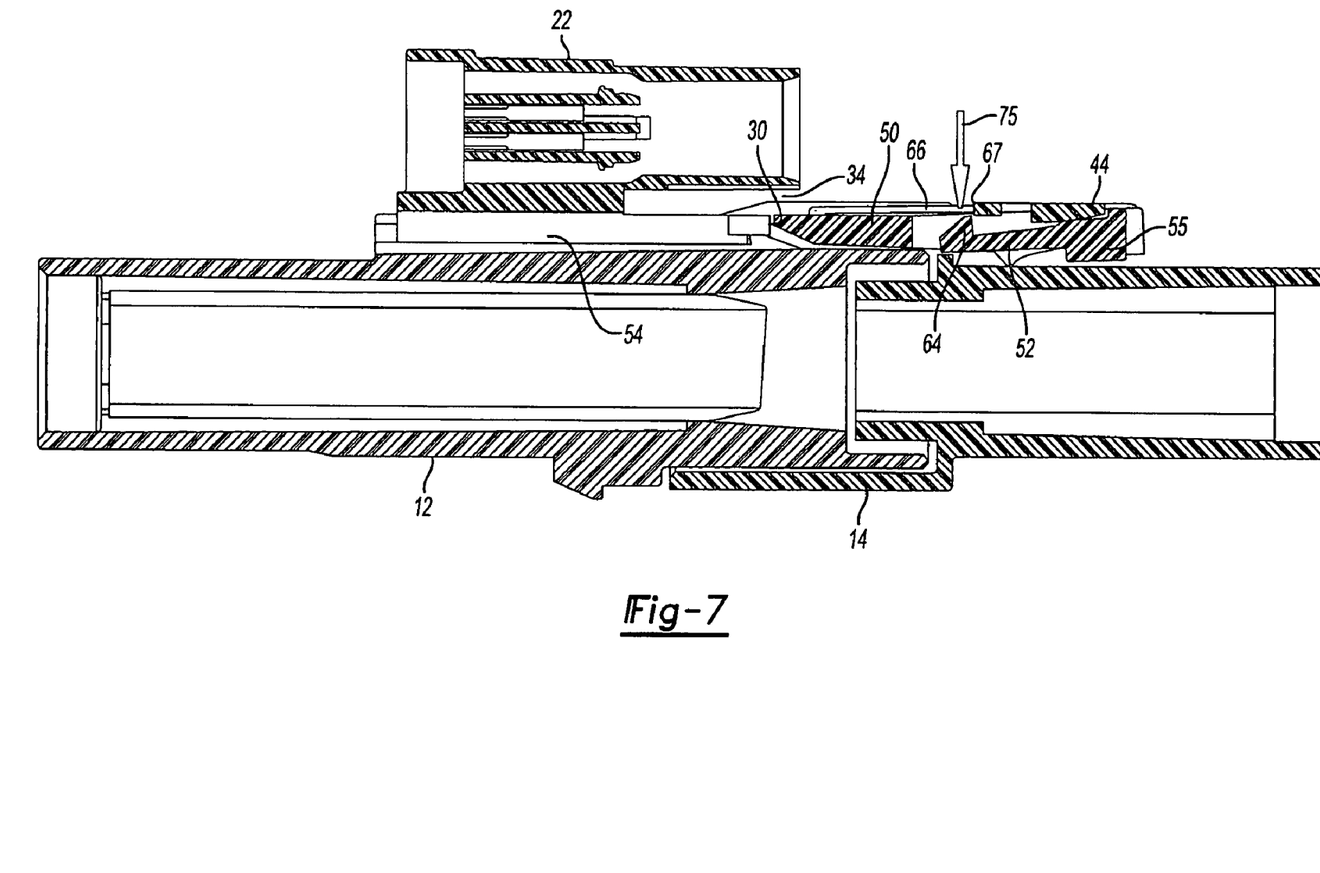
FIG. 7 is a cross-sectional view similar to FIG. 5 with the HVIL first connector disengaged and the high voltage connector housing ready to be disengaged.
Figure 8:
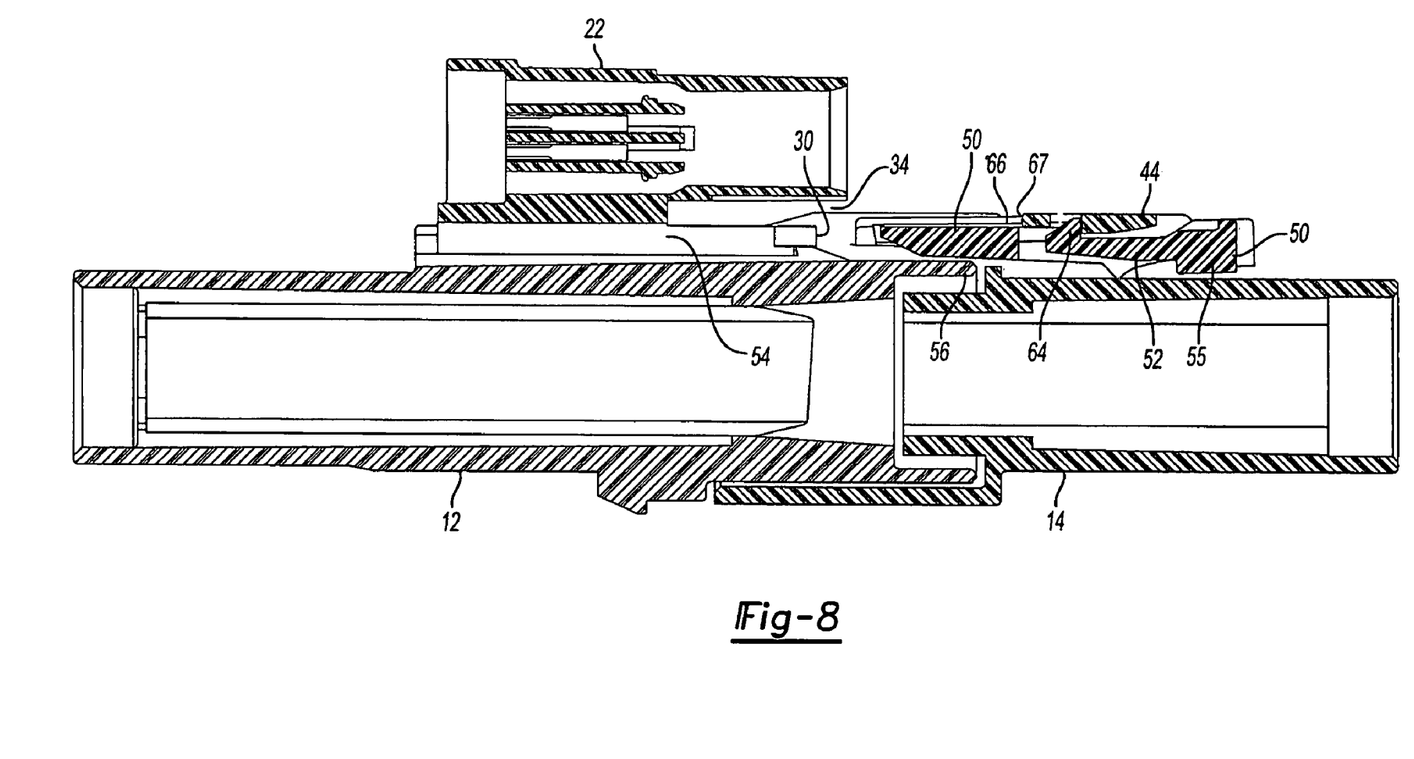
FIG. 8 is a cross-sectional view similar to FIG. 5 with the connector position assurance mechanism slid back to allow the main latching device to be operated to unlock the high voltage connector housings.

Referring now to FIGS. 6 and 7, the flex tab 60 has a canted surface 72 to allow the female connector 24 to be axially pulled and disengaged from the male connector housing 22. Once the female connector housing 24 is disengaged from the assembly 10, the slide 50 member has a lock protrusion 64 extending into an opening 66 in the latch handle 44. The opening 66 may be continuous with groove 54. A lock shoulder 67 is at one end of opening 66. The lock protrusion 64 is at a distal end of resilient tongue section 52. A tool, for example a small screw example a small screw driver or a pick, needs to push the protrusion 64 downwardly as shown by arrow 75 to disengage it from the opening 66 to bypass shoulder 67 in order to allow the slide member 50 to slide back to the set position as shown in FIG. 8. Aperture 70 with stop shoulder 71 prevents the slide member 50 from undesirably disengaging from housing 14. After the slide member 50 is moved back to the set position as shown in FIG. 8, the latch handle 44 becomes free to be depressed and release the latches 46 to unlock high voltage housings 12 and 14 from each other. The time it takes for an operator to pick up a tool, press it into opening 66 and slide the slide 50 seems to generally well exceed the preferred 5 second period of time to adequately lower the voltage below the 60 volt level.

Figure 9:
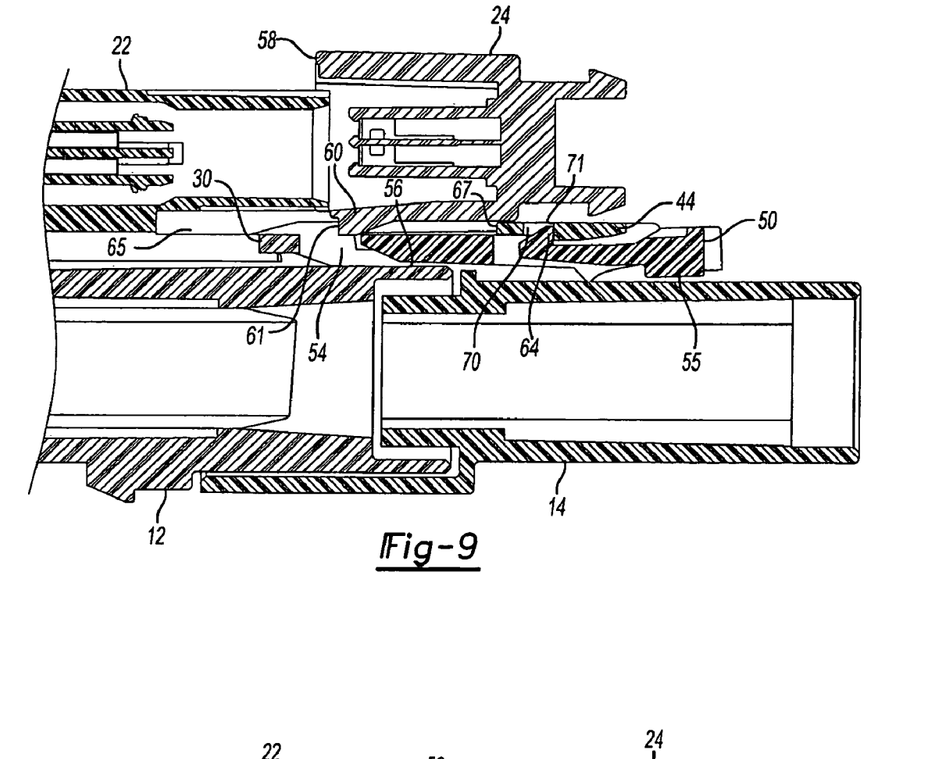
FIG. 9 is a cross-sectional view similar to FIG. 5 illustrating another improper installation attempt with the high voltage housing connected but the connection position assurance device not positioned in the installed position.
Figure 10:
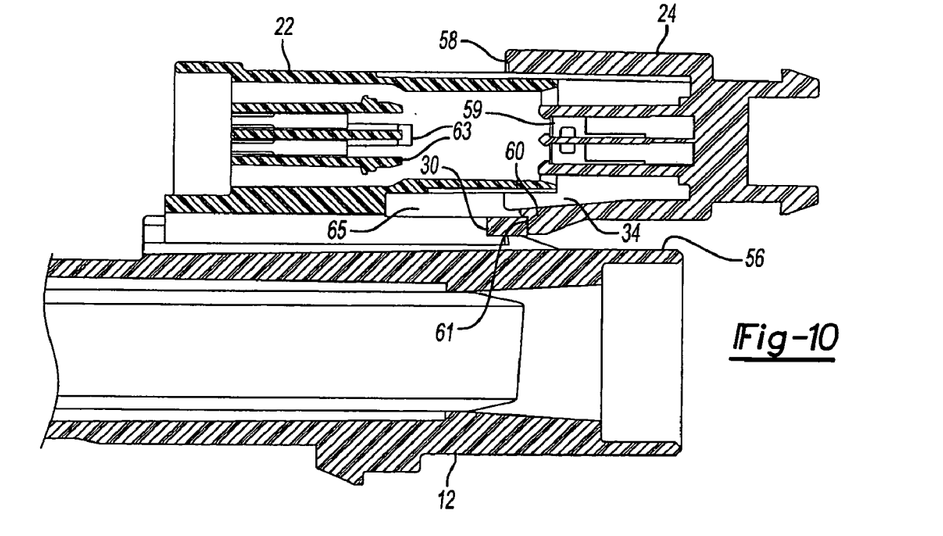
FIG. 10 is a cross-sectional view similar to FIG. 5 illustrating an improper sequence of installation of the HVIL connectors.

Furthermore, with reference to FIGS. 9 and 10, the HVIL connectors 22 and 24 cannot be engaged without the high voltage connector housings 12 and 14 previously being engaged. If the slide member 50 is not in the engaged position as shown in FIGS. 5 and 6, the flex tab 60 is in a lower position by flexing into groove 54 and its shoulder 61 abuts against the stop shoulder 30 and prevents full engagement. For example in FIG. 10 when the female high voltage connector 14 is not there, it can be seen that the tab 60 abuts the stop shoulder 30. Even if the female connector housing 14 as shown in FIG. 9 is there and partially engages but the slide member is not properly engaged, the slide 50 does not fill groove 54 and the flex tab 60 is allowed to drop into the same groove 54 and abut the stop shoulder 30.

In this fashion, an HVIL connector system for a high voltage connector provides several advantages of a system that prevent unwanted and undesirable premature connection of the low voltage HVIL circuit while also preventing unwanted and undesirable premature disconnection of a high voltage circuit of an electrically driven motor vehicle before the low voltage circuit is disconnected.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

The embodiments in which an exclusive property or privilege is claimed are defined as follows:

1. A high voltage and interlock loop assembly comprising:
    first and second high voltage connector housings complementarily constructed for releasable engagement with each other for having a high voltage circuit running therethrough;
    first and second connectors for an interlock loop circuit complementarily constructed for releasable engagement with each other;
    one of said interlock loop connectors being mounted on one of said high voltage connector housings;
    said first and second interlock loop connectors having complementarily abutment shoulders, one abutment shoulder being a flexible tab;
    said abutment shoulders abut each other and prevent full engagement when said first and second high voltage connector housings are not fully engaged with each other; and
    said flexible tab being movable by one of said high voltage connectors to misalign its abutment shoulder from said other abutment shoulder when said high voltage connector housings are properly engaged together to allow full engagement of said first and second interlock loop connectors.

2. A high voltage and interlock loop assembly as defined in claim 1 further comprising:
    said first and second interlock loop connectors being movable to disconnect and break a interlock loop circuit running therethrough; and
    said first and second high voltage connector having a latching handle mechanism constructed to be non-releasable when said first and second interlock connectors are engaged to each other.

3. A high voltage and interlock loop assembly as defined in claim 2 further comprising:
    one of said interlock connectors and high voltage connector housings require engagement with a tool to complete disconnection of said high voltage circuit within said high voltage connector housings after disconnection of said interlock loop circuit within said interlock loop connectors.

4. A high voltage and high voltage interlock loop assembly as defined in claim 3 further comprising:
    one of said high voltage connector housings having a connector positioned assurance device;
    said flexible tab being deflectable upward by a surface of said connector positioned assurance device when said high voltage connector housings are in the fully engaged position; and
    one of said second interlock loop connectors and said high voltage connector housings having a groove to receive said flexible tab to let it resiliently bias back downward to a rest position when said interlock loop connectors are fully engaged.

5. A high voltage and high voltage interlock loop assembly as defined in claim 4 further comprising:
    said connector position assurance device having a slide member with a locking protrusion that extends into an opening in the first high voltage connector housing when in the engaged position, said locking protrusion being recessable out of said opening by a tool sized to enter said opening to allow said connector position assurance slide member to move to its disengaged position and to allow said latching handle mechanism to be operable to unlock said first and second high voltage connector housings from each other.

6. A high voltage and high voltage interlock loop assembly as defined in claim 5 further comprising:
    said connector position assurance slide member having a resiliently flexible tongue that is flexible to allow said locking protrusion to exit the opening the opening under a stop shoulder.

7. A high voltage and high voltage interlock loop assembly as defined in claim 6 further comprising:
    said opening and said locking protrusion being covered by the said interlock loop connectors when said interlock connectors are engaged.

* * * * *